United States Patent
Kaplan et al.

(10) Patent No.: US 11,792,199 B2
(45) Date of Patent: *Oct. 17, 2023

(54) APPLICATION-ASSISTED LOGIN FOR A WEB BROWSER

(71) Applicant: Dropbox, Inc., San Francisco, CA (US)

(72) Inventors: Josh Kaplan, San Francisco, CA (US); Adam Cook, San Francisco, CA (US); Stephen Poletto, San Francisco, CA (US); Thomas Wright, San Francisco, CA (US); Luke Faraone, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 397 days.

This patent is subject to a terminal disclaimer.

(21) Appl. No.: 16/986,639

(22) Filed: Aug. 6, 2020

(65) Prior Publication Data

US 2020/0366681 A1 Nov. 19, 2020

Related U.S. Application Data

(63) Continuation of application No. 14/634,008, filed on Feb. 27, 2015, now Pat. No. 10,757,107.

(51) Int. Cl.
*H04L 9/40* (2022.01)
*H04L 67/02* (2022.01)
(Continued)

(52) U.S. Cl.
CPC ............ *H04L 63/102* (2013.01); *H04L 63/08* (2013.01); *H04L 67/02* (2013.01); *H04L 67/1097* (2013.01); *H04L 67/306* (2013.01)

(58) Field of Classification Search
CPC ....... H04L 63/102; H04L 63/08; H04L 67/02; H04L 67/1097; H04L 67/306
(Continued)

(56) References Cited

U.S. PATENT DOCUMENTS 9,065,819 B1 ‡ 6/2015 Shanmugam ....... H04L 63/0815
9,208,298 B2 * 12/2015 McCoy ................. H04L 63/083
(Continued)

OTHER PUBLICATIONS

Notice of Allowance from U.S. Appl. No. 14/634,008, dated Apr. 13, 2020, 8 pages.

*Primary Examiner* — Dereena T Cattungal
(74) *Attorney, Agent, or Firm* — Polsinelli PC

(57) ABSTRACT

Systems, methods, and computer-readable storage media for authenticating a user account with a synchronized content management system are disclosed. A synchronized online content management system may receive a request from a client device to access content in the content management system via a web browser that is running on the client device. The system may identify that a client-side application for the content management system has been installed on the client device and that the client-side application is already logged into a user account with the content management system. The system can cause the web browser to open a local host connection to the client-side application such that the web browser may be able to obtain from the client application some user account identifying information for the user account. The system can then cause the web browser to log into the user account by using the user account identifying information.

19 Claims, 9 Drawing Sheets

(51) Int. Cl.
*H04L 67/306* (2022.01)
*H04L 67/1097* (2022.01)

(58) Field of Classification Search
USPC .......................................................... 726/7
See application file for complete search history.

(56) References Cited

U.S. PATENT DOCUMENTS

| | | | | |
|---|---|---|---|---|
| 9,374,361 | B2 ‡ | 6/2016 | Khalil | H04L 63/0815 |
| 2009/0260077 | A1 ‡ | 10/2009 | Zhu | G06F 21/34 |
| | | | | 726/19 |
| 2011/0287739 | A1 ‡ | 11/2011 | Cajigas Bringas | H04L 63/18 |
| | | | | 455/410 |
| 2011/0296038 | A1 ‡ | 12/2011 | Mandre | H04L 67/142 |
| | | | | 709/22 |
| 2012/0260321 | A1 * | 10/2012 | Wendt | H04L 67/02 |
| | | | | 726/5 |
| 2012/0272133 | A1 * | 10/2012 | Carroll | G06F 16/957 |
| | | | | 715/234 |
| 2012/0324556 | A1 ‡ | 12/2012 | Yefimov | H04L 63/0807 |
| | | | | 726/7 |
| 2013/0086669 | A1 ‡ | 4/2013 | Sondhi | H04W 12/0608 |
| | | | | 726/8 |
| 2013/0227668 | A1 ‡ | 8/2013 | Mocanu | G06F 21/41 |
| | | | | 726/8 |
| 2013/0269019 | A1 * | 10/2013 | Garmark | H04L 63/0823 |
| | | | | 726/9 |
| 2014/0082715 | A1 * | 3/2014 | Grajek | H04W 12/068 |
| | | | | 726/8 |
| 2014/0181944 | A1 * | 6/2014 | Ahmed | H04L 67/04 |
| | | | | 726/8 |
| 2014/0207566 | A1 ‡ | 7/2014 | Kamran | G06Q 30/0241 |
| | | | | 705/14 |
| 2014/0223527 | A1 ‡ | 8/2014 | Bortz | H04L 63/08 |
| | | | | 726/6 |
| 2014/0282983 | A1 * | 9/2014 | Ju | H04W 12/068 |
| | | | | 726/8 |
| 2015/0363581 | A1 * | 12/2015 | Ranadive | G06F 21/34 |
| | | | | 726/19 |

* cited by examiner
‡ imported from a related application

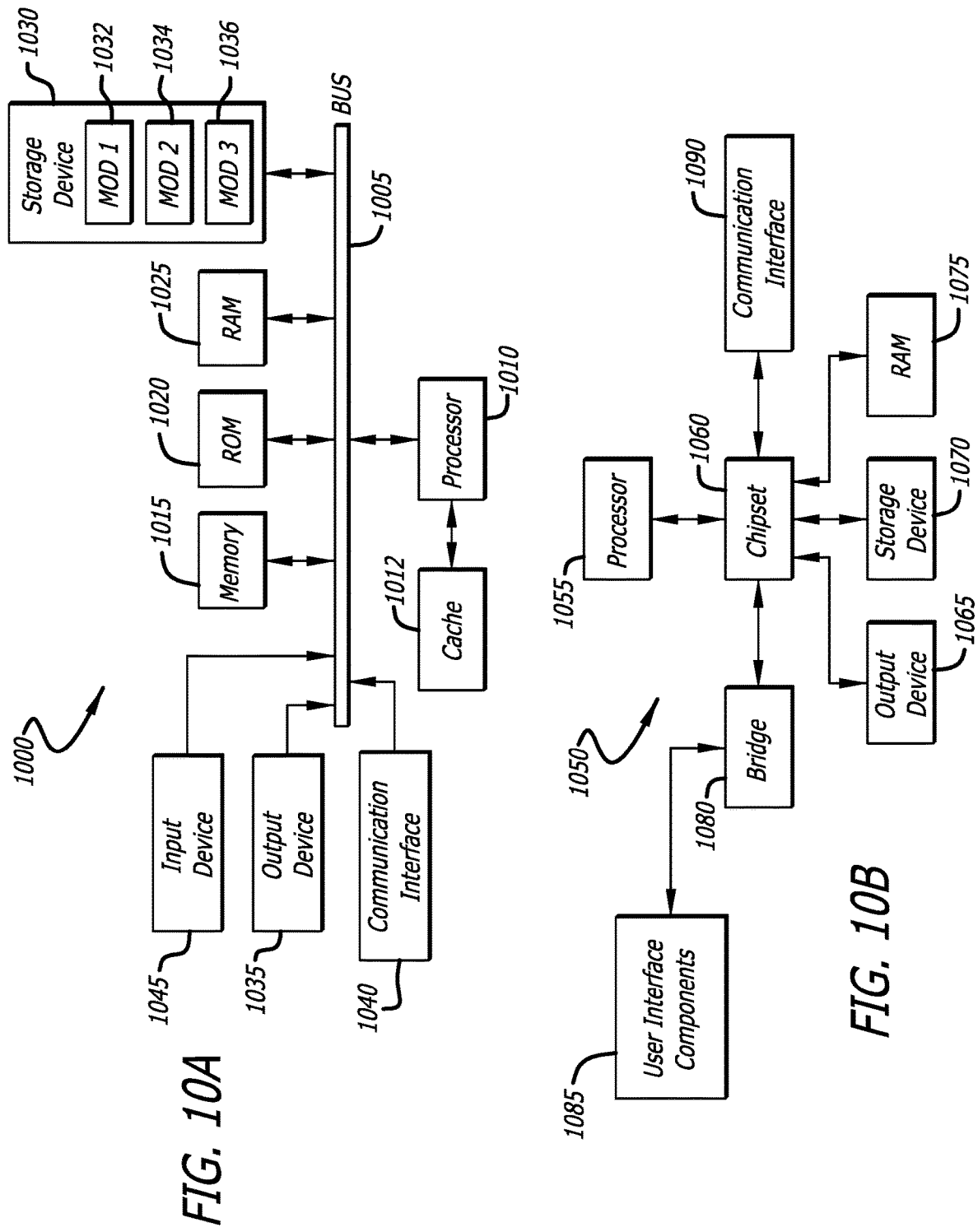

APPLICATION-ASSISTED LOGIN FOR A WEB BROWSER

CROSS-REFERENCE TO RELATED APPLICATIONS

This application is a continuation of U.S. application Ser. No. 14/634,008, filed on Feb. 27, 2015, entitled, APPLICATION-ASSISTED LOGIN FOR A WEB BROWSER, which hereby expressly incorporated herein by reference in its entirety.

TECHNICAL FIELD

The present technology pertains to online content management systems, and more specifically pertains to automatically logging into a user account with a content management system from a web browser.

BACKGROUND

An online-synchronized content management system, such as Dropbox from Dropbox Inc. of San Francisco, Calif., allows its users to store and synchronize data on a cloud-based storage and across multiple client devices. Thus, for example, a user may upload a personal folder to the content management system, and then authorize multiple user devices to make duplicate copies of the folder on each of the devices. The instances of the folder can be kept synchronized across the devices. In other words, through the process of synchronization, the contents of the folder on multiple client devices can be kept identical. Even the slightest modification made by the user to one of the instances of the folder can automatically be replicated in other instances of the folder in a matter of seconds.

In order to protect the content synchronized in the content management system, the system creates separate user accounts for individual users of the system. Each user typically creates a unique username and assigns a password for her user account so that other unauthorized users could not access her content in the content management system. This means that the user, in general, must first provide the username and password to the content management system to login or sign into the user account before gaining access to the content. These security measures, however, can become a double-edged sword, in that, although the sign-in process may provide protection against unauthorized access, the requirement to enter the user credentials may pose inconvenience to the user.

Moreover, when a user accesses the content management system through two or more applications, platforms, or devices, the user may be required to provide the login credentials each time she uses a different application, platform, or device. For example, even after a user logs into her user account on a dedicated client application for the content management system, when the user opens up a web browser that runs on the same device to access the content management system through the web browser, she may be asked to replicate the sign-in process all over again by providing the same user credentials to the web browser. This may not only be inconvenient for the user, the added measure of security may be unnecessary because it can be reasonably assumed that the person who is requesting access through the web browser is the same user who has already provided the same information to the dedicated client application running on the same device.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for minimizing or reducing the need for user authentication when a user uses both a client application and a web browser to access a content management system. Specifically, the disclosed technology solves a problem that uniquely arises in the fields of computer technology, Internet communications, and networking, where identities of people and devices need to be ascertained and verified digitally. In other words, the disclosed solution is rooted in computer technology in order to overcome a problem specifically arising in the computer networks. Indeed, the subject technology improves the functioning of the computer by allowing it to log into a user account more efficiently.

This disclosure describes a mechanism for authenticating a user account on a web browser that is running on a client device when a user of the client device has already provided login credentials to a client-side application that is also running on the same client device. Specifically, a web browser running on a client device may send a request to a content management system to access content in the content management system. The content management system may first require that the web browser be logged into a user account. The content management system can identify a client-side application that is installed on the client device. The client-side application can be associated with the content management system and may already be logged into a user account with the content management system.

The content management system can direct the web browser to establish a connection with the client-side application to obtain some user account identifying information for the user account. The web browser can try to open such a connection, such as a local host connection, to the client-side application. The client-side application may be constantly running a local web host server that listens in for a potential connection request from web browsers. Once the client-side application receives a request from the web browser to open a local host connection, the application can first verify that the request comes from a legitimate source. For example, the client application can examine the list of processes that are running on the client device, examine the origin header of the connection request, compare the signature of the web browser against a list of known browsers, etc., to make sure that it is safe to give out identifying information.

The client-side application can provide the user account identifying information, such as a username, a password, an email address, a token, and/or a nonce, to the web browser. Optionally, the browser can also give the user an option to choose between continuing on the web browser as the same user account as the client application or logging in as a different user. If the user chooses to continue as the same user, the web browser can use the user account identifying information, received from the application client, to sign into the user account and allow the user to access content in the content management system via the user account.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 10A shows a conventional system bus computing system architecture; and

FIG. 10B shows a computer system having a chipset architecture

DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

Figure 1:
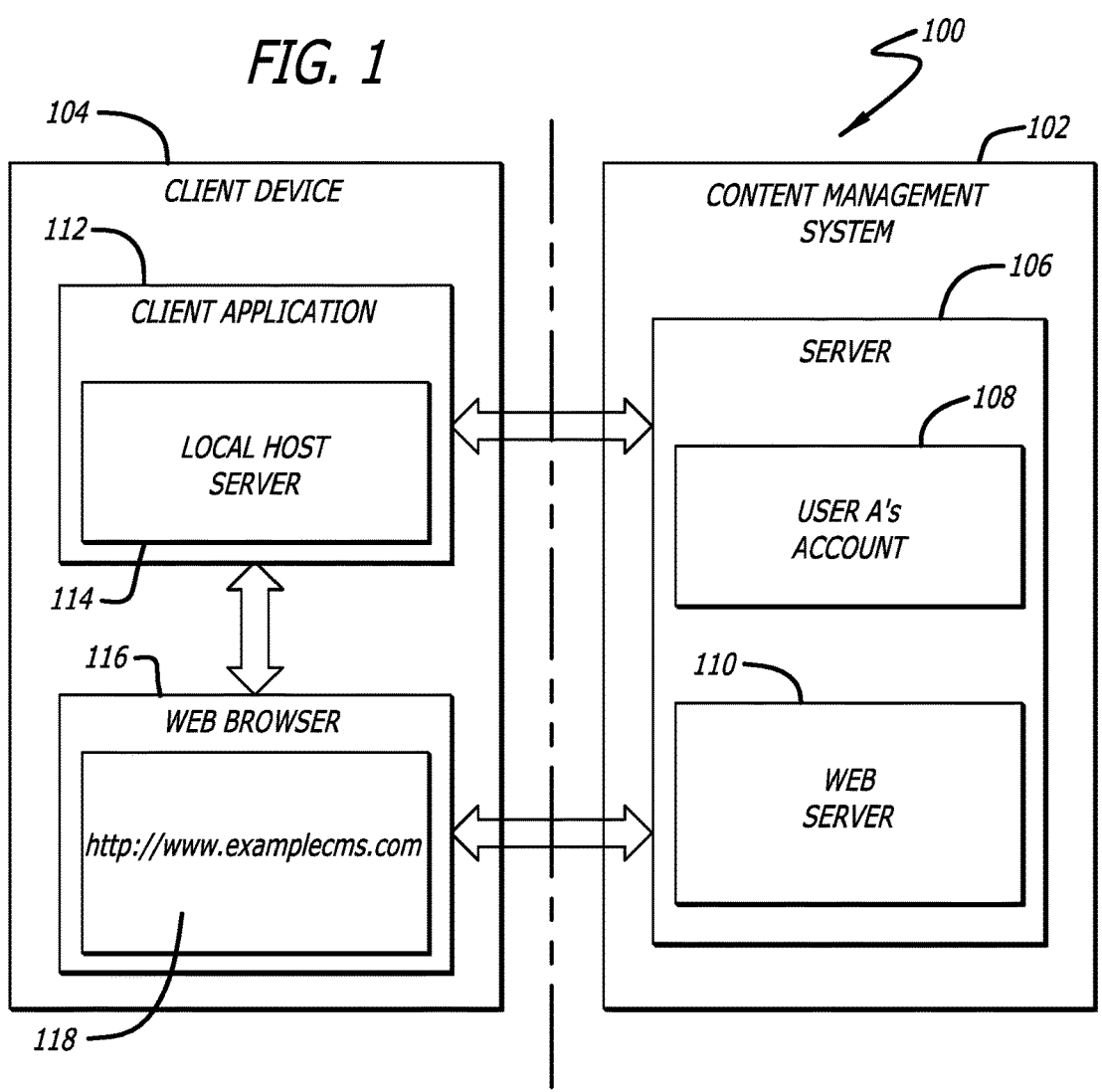
FIG. 1 shows a block diagram of an exemplary login process with a content management system.

The disclosed technology addresses the need in the art for authenticating users of online content management systems. FIG. 1 shows a block diagram of an exemplary login process with content management system 102. Exemplary system 100 consists of content management system 102 and one or more client devices, including client device 104. Content management system 102, as will be discussed later, can run on server 106 or a group of servers. Server 106 can store information for various user accounts that are registered with content management system 102. The user accounts may be managed by an account management module or user account database of content management system 102. The user accounts are tied to individual users, clients, members, or subscribers that use the services provided by content management system 102. The user accounts hold information about respective users' profiles, credentials, synchronized data, membership information, etc. For example, user A's account 108 may hold information about the exemplary user A's profiles (e.g., name, address, email address, phone number, etc.), login credentials (e.g., username, password, security questions, cryptographic nonces, etc.), synchronized data (e.g., files, folders, documents, etc.), and membership information (e.g., date joined, membership tier, subscription status, billing information, standing, etc.). Server 106 can also have web server 110 that can generate and service static and dynamic webpages for any client software, such as a web browser, that may attempt to access content management system 102 via a web interface and/or the Hypertext Transfer Protocol (HTTP). Web server 110 can be part of content management system's 102 communications interface and/or user interface module.

Meanwhile, on the client side, one or more client devices, such as client device 104, can communicate with server 106 to access the contents stored on content management system 102. Client device 104, as will be discussed later, can be any computing device that is capable of managing and/or storing data. For example, client device 104 can be a desktop computer, a laptop computer, a mobile device, a phone, a wireless phone, a smartphone, a tablet device, a wearable computing device, a gaming console, an entertainment device, an appliance, a set-top box, a vehicle, etc. A user may use client device 104 to synchronize data with content management system 102 or otherwise remotely access and manage data stored in content management system 102.

Client device 104 can have client application 112 (also called, "client-side application," "desktop application," etc.) installed and running on client device 104. Client application 112 can be a native application that runs on client device's 104 operating system (OS). For example, if client device 104 is a Windows® PC, client application 112 can be a Windows® application. In another example, if client device 104 is an iPhone® mobile smartphone, client application 112 can be an iOS® app. Users can download client application 112 from a website (such as content management system's 100 own website) or an application marketplace, and install it on client device 104. A dedicated client application such as client application 112 can synchronize data between client device 104 and content management system 102 and provide a user interface to the user of client device 104.

Client application 112 may have local host server 114 (also known as a local web server) that can generate and/or service dynamic and static web documents (e.g., HyperText Markup Language (HTML) files, PHP files, etc.) to local and remote clients. Local host server 114 can be part of client application 112 or it can be a separate entity that exists outside client application 112.

Client device 104 can also have web browser 116 installed and running on it. Web browser 116 allows a user to access web content on networks such as the Internet by fetching and rendering web documents according to various web protocols and scripting language standards. For example, web browser 116 can navigate to content management system's 102 website address 118 to access its content. Web browser 116 may also be used to access local content on client device 104. Specifically, web browser 116 can establish a local communication channel to client application 112 by, for example, requesting to local host server 114 to open a local host connection with web browser 116.

When the user (e.g., user A) of client device 104 uses web browser 116 to navigate to content management system's website 118, web server 110 can allow the user to skip through the user's normal sign-in process by utilizing client application 112, which may be already signed into the user's user account. Specifically, server 106 can determine whether client device 104 has any client applications that may be installed on client device 104 and can aid in the sign-up process. This determination can be made by accessing user account information 108 and comparing the Internet Protocol (IP) address of client device 104 against known IP addresses of client applications used by users. Once it is determined that client device 104 has client application 112 installed, web server 110 can direct web browser 116 to establish a local host connection with local host server 114. Web server 110 can accomplish this task by generating and servicing a webpage to web browser 116, where the webpage contains a command (e.g., "GET" or "POST" command) with a reference to local host server 114 (e.g., self-referential localhost address 127.0.0.1). Web server 110, for example, can direct web browser 116 to fetch from local host server 114 a webpage with a predefined name and/or via predefined port number. For example, content management system's 102 webpage may direct web browser 116 to fetch the file/login/dbx15413.html from the localhost address 127.0.0.1 through port 81000. In some embodiments, however, web server 110 can direct web browser 116 to attempt to establish a local connection with client application 112 without first verifying the existence of client application 112. In such embodiments, web server 110 can simply direct web browser 116 to blindly attempt to open the local connection with any local web server that might be present on client device 104.

Once web browser 116 establishes a local host connection to client application 112, web browser 116 can request user account identifying information from client application 112. The user account identifying information may be a piece of data that allows web browser 116 to log into user A's user account. For example, the user account identifying information can be a name, a username, an email address, a password, a security token, a cryptographic nonce, or a combination of any of these items. A nonce can be a randomly generated number or bit string that is used only once in a cryptographic communication. Thus, a nonce may be discarded and newly generated each time web browser 116 requests one from client application 112. Client application 112 can generate the user account identifying information or receive it from content management system 102 after client application 112 logs into user A's user account. User A may have provided login credentials, such as a username and password, to client application 112 in order to log client application 112 into user A's user account.

After client application 112 receives the request for the user account identifying information, client application 112 may attempt to verify whether the request originates from a legitimate source. In other words, client application 112 may try to find out if the request actually comes from within client device 104 and presumably from user A, who owns client device 104, and not from any malicious entity outside client device 104. This determination can be done in several ways. For instance, web browser 116 can simply announce its identity to client application 112. In other situations, client application 112 can examine the list of processes that are running on client device 104 and determine the identity of the application that sent the request. The identity of the application may be compared against a list of known web browsers. Client application 112 can locate the executable file of web browser 116, compute its cryptographic signature, and confirm that it is, in fact, signed by a known publisher of web browser, such as Google®, Microsoft®, Apple®, etc. This can prevent a malicious attacker from creating a bogus executable with the same name and trying to pass it off as a legitimate web browser. Client application 112 may also examine the origin header associated with the request from web browser 116 to make sure that the webpage that is referencing local host server 114 originates from a domain name associated with content management system 102 (e.g., examplecms.com). Client application 112 can also cross-reference any information that it collected about the originator of the request with any information that content management system 102 may be able to provide. For example, content management system 102 may be able to provide to client application 112 any identifying information about web browser 116 when it navigated to web server 110 earlier. In certain situations, client application 112 may omit the request verification steps.

Once client application 112 determines that the request is legitimate, or if the security policy does not require verification, client application 112 can transmit the requested user account identifying information to web browser 116. This can be accomplished by various means. For example, client application 112 can, through its local host server 114, generate a local HTML page that contains the user account identifying information, which web browser 116 can then read in to obtain the user account identifying information. Alternatively, local host server 114 may leave in web browser 116 an HTTP cookie that contains the user account identifying information. The communication between client application 112 and web browser 116 can take place in the background without requiring that web browser 116 load a new page. This way, the transaction of user account identifying information can happen more smoothly and with minimum interruption to the user's browsing activity. The communication channel between client application 112 and web browser 116, for the purpose of transferring the user account identifying information, can be implemented by, for example, AJAX (asynchronous JavaScript and XML) requests or WebSockets.

After client application 112 obtains the user account identifying information from client application 112, web browser can present the information to server 106 in order to log into the user account. In one example, the user account identifying information can be a nonce. The nonce may have been generated by client application 112 and transmitted to server 106, or in the alternative, it may have been generated by content management system 102 and sent to client application 112. In either case, client application 112 and content management system 102 would each have a copy of the nonce. After web browser 116 obtains the nonce from client application 112, web browser 116 can present the nonce to content management system 102. Then, content management system 102 can compare the first nonce that it generated or received from client application 112 with the second nonce that it received from web browser 116. If the two values match, content management system 102 can safely assume that web browser 116 is running on the same client device 104 that the already authenticated client application 112 is installed on. Accordingly, content management system 102 may allow web browser 116 to log into user A's user account 108.

Figure 2:
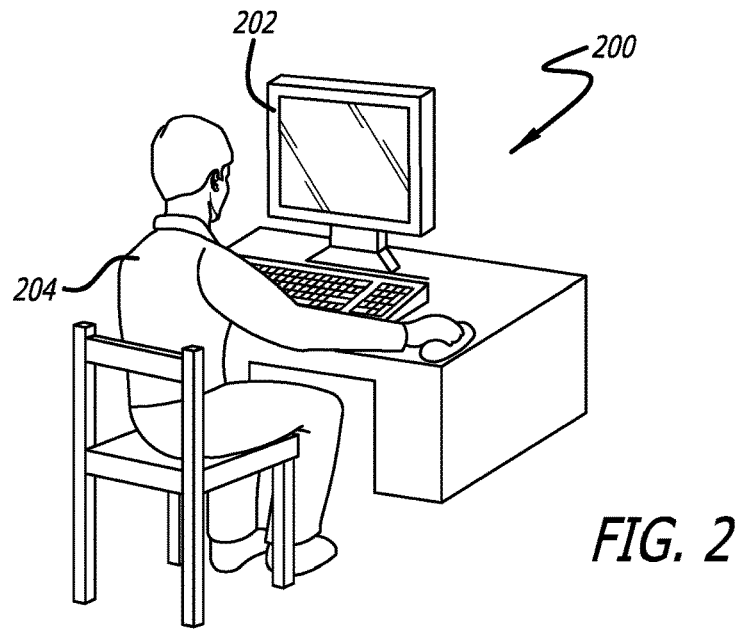
FIG. 2 shows an exemplary embodiment of a client device being accessed by a user.

FIG. 2 shows exemplary embodiment 200 of client device 202 being accessed by user 204. User 204 may be a subscriber with an exemplary content management system called ExampleCMS. User 204 can use desktop computer 202 to connect to ExampleCMS, synchronize data, and/or access the content management system's content. User 204 can also use any other devices that he may have to access the content management system. Similarly, more than one users can use client device 202 to connect to the content management system.

Figure 3:
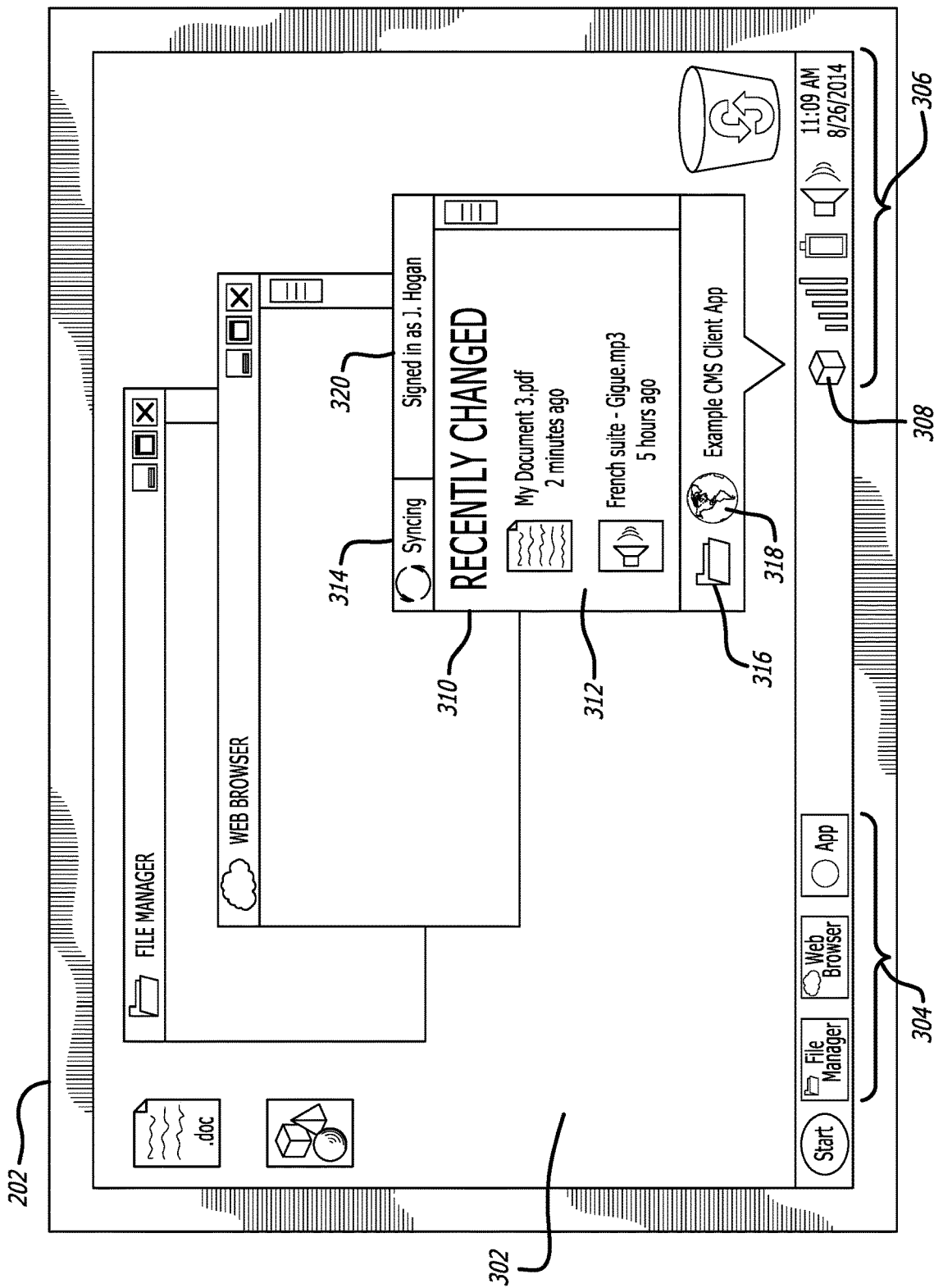
FIG. 3 shows an exemplary embodiment of a client-side application.

FIG. 3 shows exemplary embodiment 300 of client-side application 310 running on client device 202. Client device 202 may be equipped with an operating system and a user interface (UI) such as desktop graphical user interface 302. Client device 202 can also execute one or more applications 304 (e.g., file manager, web browser) that are native to the operating system. User interface 302 may also feature notification icons area 306, where icons and other information may be displayed to the user for quick access and viewing. Among the various applications that may be executed and running on client device 202, client-side application 310 for ExampleCMS can be installed on client device 202. Client-side application 310 can be a native application running on the operating system of client device 202. In the alternative, client-side application 310 can be a widget or a plug-in for another application. Client application 310 can run both in the background or foreground to constantly monitor client device's 202 file system and synchronize all or a portion of the data stored in client device 202 with ExampleCMS.

Client application 310 can have its own user interface 312, where any recently updated files or folders may be displayed and interacted with. Synchronization status indicator 314 informs the user about whether the data stored in client device 202 are "up to date" with the content stored in ExampleCMS or currently "syncing." Other UI elements, such as "open synchronized folder" button 316 or "open ExampleCMS website" button 318, can allow the user to view and access synchronized content locally on client device 202 or remotely on the ExampleCMS server. Finally, login status indicator 320 can indicate which user account that client application 310 is currently logged into. In exemplary embodiment 300, client-side application 310 is shown as being signed in as "J. Hogan." The user may have previously logged in as "J. Hogan" by providing to application 310 the username and password associated with that user account. Client application 310 can be represented as icon 308 in notification tray area 306 such that a user can easily access app 310 by, for example, clicking on or hovering over icon 308 with an input device such as a mouse.

Client application 310 can operate a local web server (not shown). The local web server can be a component of client application 310 that runs in the background and hidden from the view of the user. Other applications 304 running on client device 202, such as a web browser, can make a local host connection to the local web server by referencing the localhost IP address (i.e., 127.0.0.1). The local web server can be configured to listen in on the specific port number (e.g., 5500) or a range of port numbers for any incoming local connection request.

Figure 4:
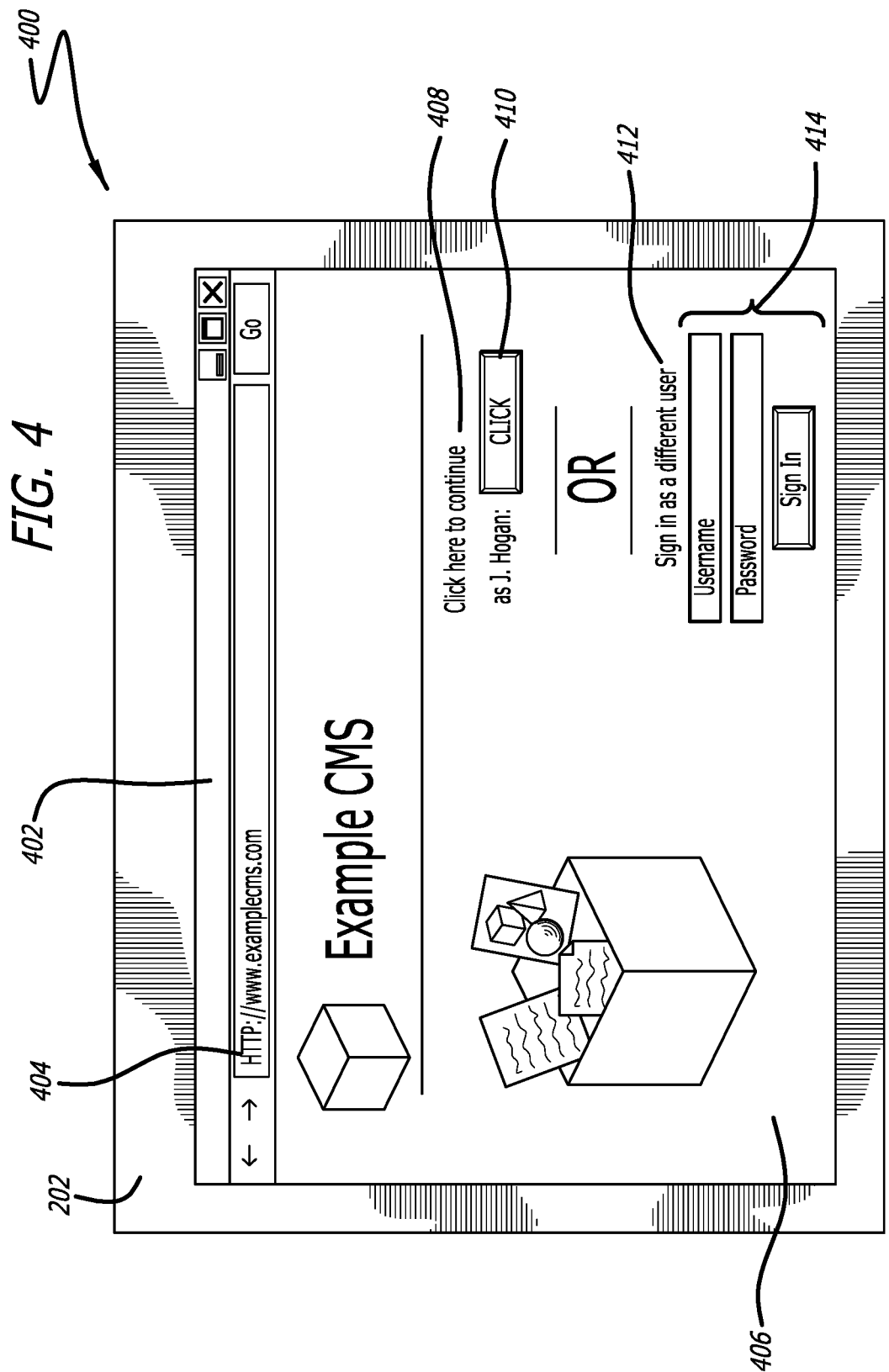
FIG. 4 shows an exemplary embodiment of a login screen for the content management system's website.

FIG. 4 shows exemplary embodiment 400 of login screen 406 for the content management system's website. As discussed above, client device 202 can run various applications, such as web browser 402. The user can use web browser 402 to access ExampleCMS by entering address 404 (i.e., uniform resource locator (URL)) for the content management system's website (e.g., "http://www.examplecms.com"). If not already logged into a user account, website 406 may direct web browser 402 to login screen 406. Typically, website 406 would require that the user log into his account by providing his user credentials if he has not already done so. This can be cumbersome and inconvenient for the user because he essentially has to input the same information to his device more than once. The disclosed technology addresses this problem, which arises specifically in the fields of computer networks and more specifically to Internet communications, by allowing the computing device to bypass any subsequent user sign-in process. Thus, website 406 can provide the user with a choice between first choice 408 to continue as the user account, "J. Hogan," or second choice 412 to sign into a user account different from the one that client application 310 is already signed into. The user can choose first option 408 by, for example, clicking on button 410, or choose second option 412 by providing new user credentials 414. In some variations, ExampleCMS may automatically log browser 402 into the same user account as client application 310 without giving the user a choice between two options 408, 412.

In the background, web browser 402 may establish a local host connection with client-side application 310 to obtain user account identifying information (e.g., username, password, nonce, etc.) for the user account "J. Hogan" after the user chooses first option 408 and clicks on button 410. Alternatively, web browser 402 can obtain the user account identifying information from client-side application 310 via the local host connection before the user chooses first option 408, or even before presenting options 408, 412 to the user. In such a case, when the user makes a choice for option 408, web browser 402 can simply use the already retrieved user account identifying information to log in to the user account.

Figure 5:
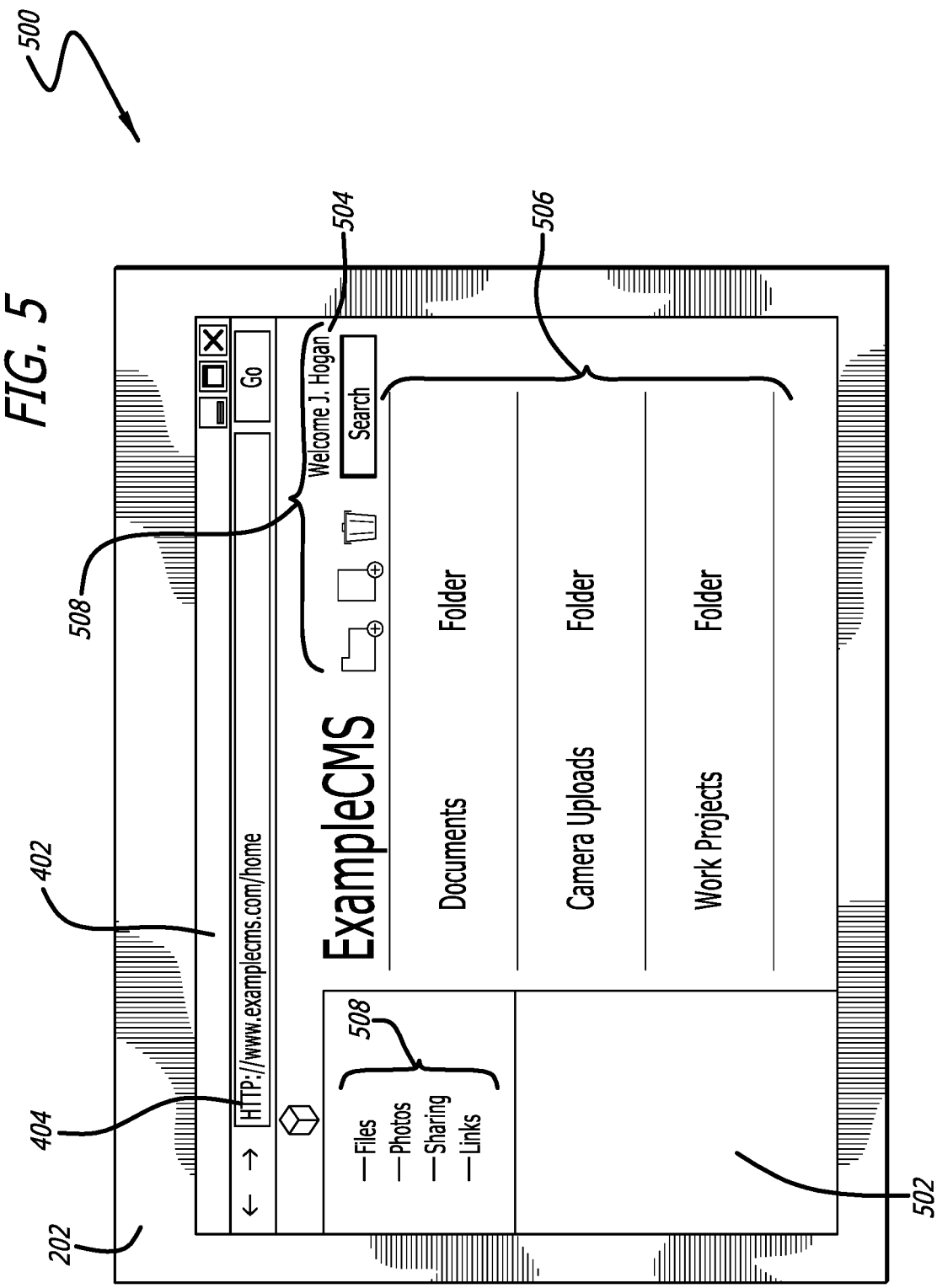
FIG. 5 shows an exemplary embodiment of the content management system's website after a login.

FIG. 5 shows exemplary embodiment 500 of the content management system's website 502 after a successful login. Web browser 402 can sign into the user account "J. Hogan" by transmitting the user account identifying information, such as a nonce, to ExampleCMS' server. Then, ExampleCMS can validate the user account identifying information to make the determination as to whether web browser 402 may be logged into the same user account as client application 310 without requiring the user to enter user credentials again. If the user account identifying information successfully checks out (i.e., the user account identifying information provided by web browser 402 corresponds with what ExampleCMS already knows about client application 310), then ExampleCMS can allow web browser 402 to log into the user account "J. Hogan," as evidenced by login indicator 504, and web browser 402 is directed to the user account's home screen 502. Home screen 502 may feature content display area 506, where the user may access various files and folders (e.g., "Documents," "Camera Uploads," "Work Projects"). Home screen 502 may also include navigation menu 508, where the user can select a command from a variety of available options (e.g., "Files," "Photos," "Sharing," "Links," "Create new folder," "Create new document," "Delete file," etc.).

Figure 6:
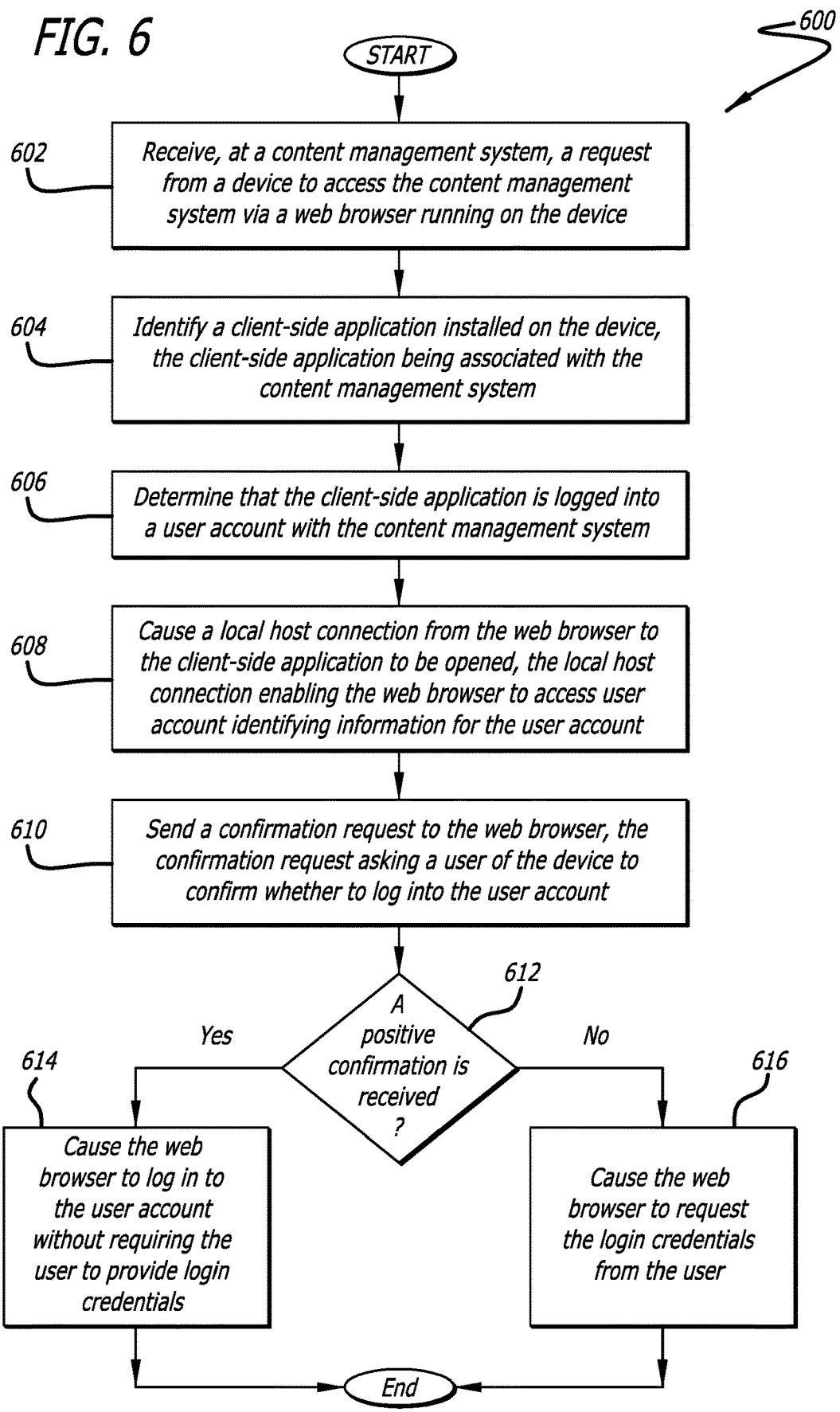
FIG. 6 shows an exemplary method of processing a login request at a content management system from a web browser.
Figure 7:
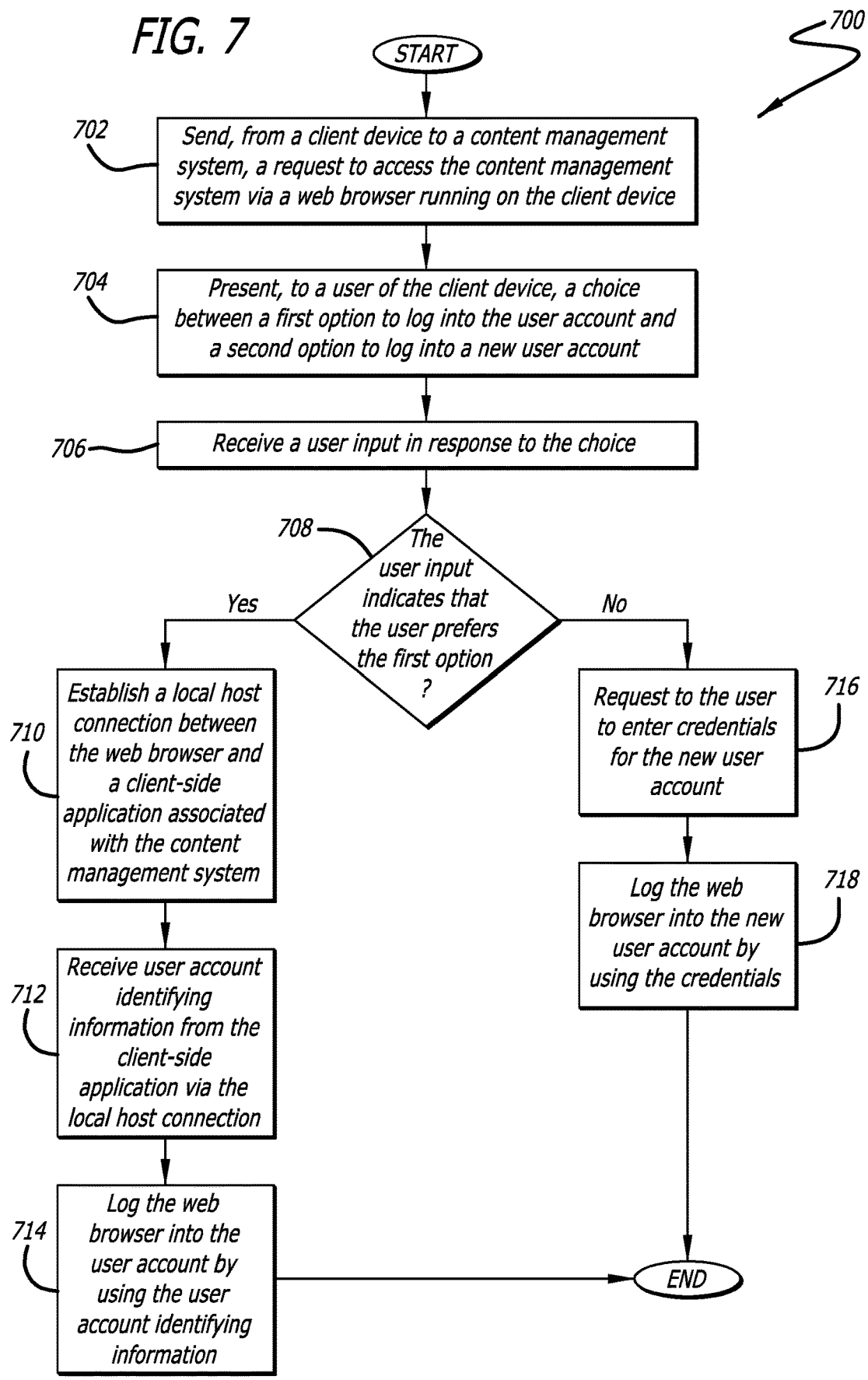
FIG. 7 shows an exemplary method of logging a web browser into a user account.
Figure 8:
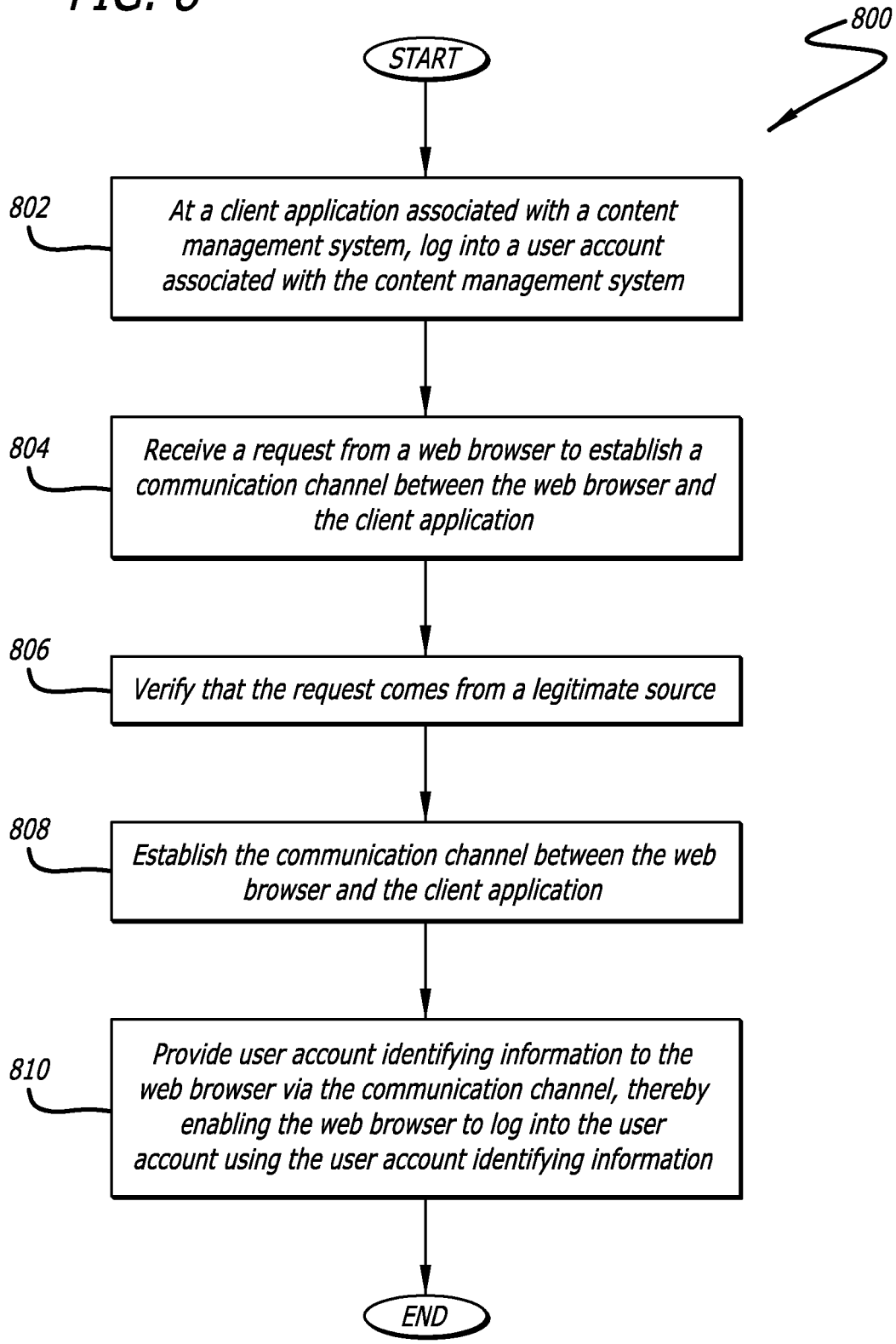
FIG. 8 shows an exemplary method of assisting a web browser to log into a user account by a client-side application.
Figure 9:
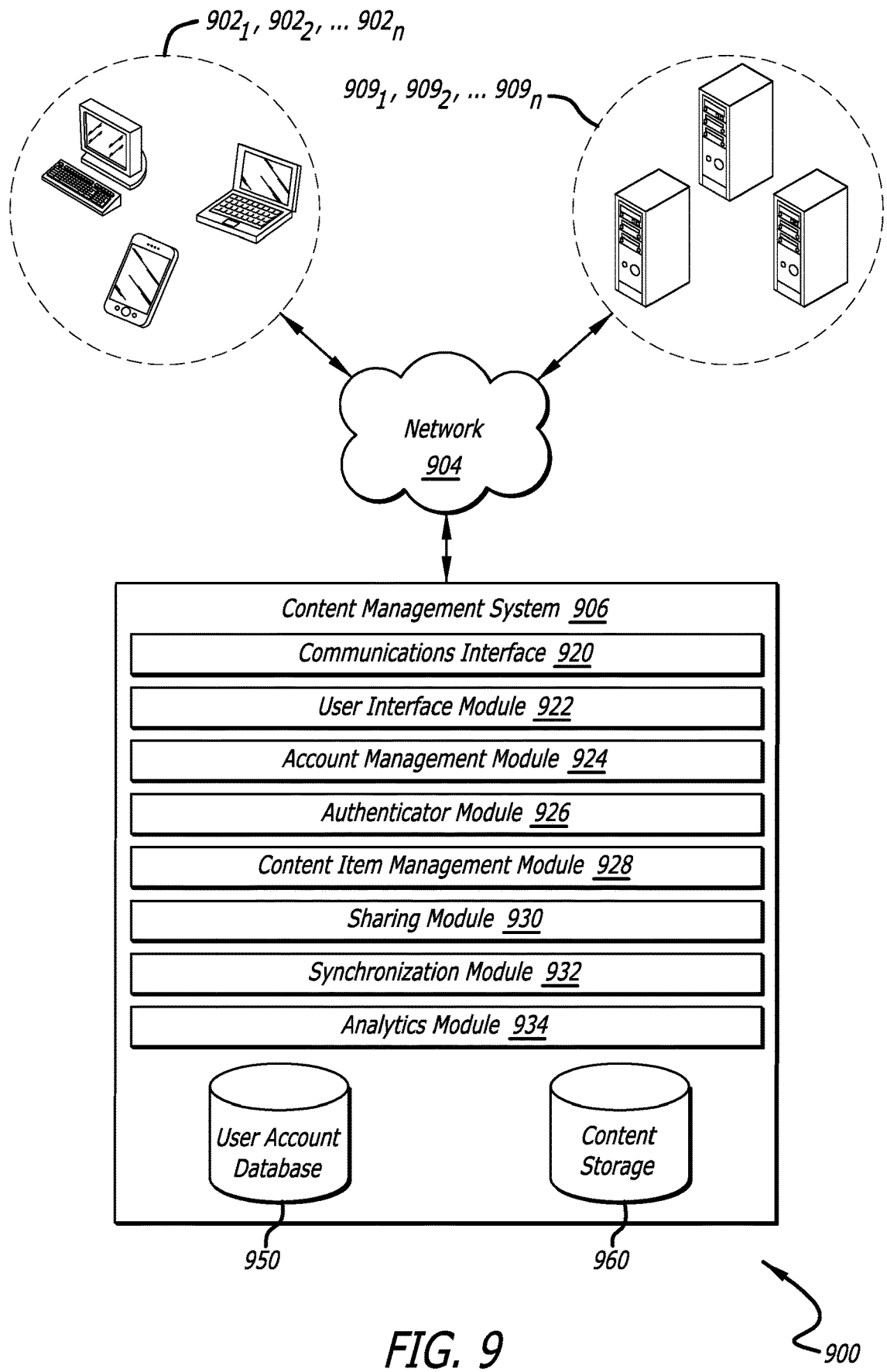
FIG. 9 shows an exemplary configuration of devices and a network in accordance with the invention.

Having disclosed some basic concepts, the disclosure now turns to the example method embodiments shown in FIGS. 6-8. For the sake of clarity, the methods are described in terms of system 900, as is shown in FIG. 9 and will be discussed below in further detail, configured to practice the method. Alternatively, however, the methods may also be practiced by system 100 as shown in FIG. 1, system 1000 as shown in FIG. 10A, or system 1050 as shown in FIG. 10B. It is to be noted that, although the inventive techniques disclosed herein are described in relation to online content management systems throughout this disclosure, they may also be practiced with regards to any system that may require authentication. The steps outlined herein are exemplary and can be implemented in any combination thereof in any order, including combinations that exclude, add, or modify certain steps.

FIG. 6 shows an exemplary method of processing a login request at a content management system from a web browser. This exemplary method can be performed by a server, such as the content management system. System 900 may receive a request from a device to access a content management system via a web browser running on the device (602). The request may be received by the content management system, and the device can be a client device associated with the content management system. System 900 may determine that the user of the web browser has not been authenticated yet (i.e., not logged into a user account), and may not allow the user to access any content via the web browser yet. System 900 may identify a client-side application that is installed on the device, and the client-side application is associated with the content management system (604). The client-side application can be an application specifically designed to access content on the content management system and synchronize data between the content management system and a client device that the application is installed on. The user can download the application and install it on the device in order to facilitate syncing of user data in the background (i.e., automatically without user intervention). The client-side application can include a local host server (i.e., web server) that other applications or devices can connect to. The client application can be logged into a user account with the content management system. A user of the device could enter sign-in credentials, such as a username and password, to the client application in order to do so.

System 900 can determine that the client-side application is logged into a user account with the content management system (606). System 900 can monitor all the client-side applications that may connect to the content management system and should be able to identify which user account, if any, that the client-side application installed on the device is logged in as. System 900 can cause a local host connection from the web browser to the client-side application to be opened, and the local host connection can enable the web browser to access user account identifying information for the user account (608). The local host connection can be established between the web browser and the local host server that may be part of the client-side application. The local host connection can be a communication channel such as an HTTP connection, a WebSocket connection, etc. System 900 can cause the connection to be opened by sending a signal, instruction, or command to the web browser. For example, system 900 can generate and service a webpage that contains an instruction to locate and/or contact any local host server that might be present on the client device. The user account identifying information can be a name, a username, an email address, a password, a token, and/or a cryptographic nonce. The user account identifying information can be any data that can identify or validate the user account.

Optionally, system 900 can send a confirmation request to the web browser, and the confirmation request can ask a user of the device to confirm whether to log into the user account (610). Although the client-side application may be already logged into one user account, a user of the device may not wish to log into the same user account on the browser. For example, the device may be shared by more than one users (e.g., family computer, public library computer) and one user may wish to sign in as a different user account. In such a case, the confirmation request can give the user a chance to choose between the two options. If a positive confirmation is received from the user (612), then system 900 may cause the web browser to log in to the user account without requiring the user to provide additional login credentials (614). The web browser can do so by using the user account identifying information. For example, the web browser can present the user account identifying information, such as a nonce, to the content management system, thereby proving to the system that the web browser has successfully made a local connection to the client application and the web browser and the client application are running on the same device. Thus, the web browser can log into the user account without receiving or requiring from the user of the device, user credentials that are associated with the user account. If, however, a negative confirmation is received from the user (i.e., the user has chosen not to continue as the user account) (612), then system 900 can cause the web browser to request login credentials from the user (616). Here, the user can provide the login credentials (e.g., username, email address, password, etc.) for the same user account or a different user account altogether.

FIG. 7 shows an exemplary method of logging a web browser into a user account. This exemplary method can be performed by the web browser. System 900 can send, from a client device to a content management system, a request to access the content management system via a web browser running on the client device (702). A client-side application, which is associated with the content management system, may also be running on the client device, and the client-side application can be logged into a user account before the request is sent. In other words, the client-side application may be already signed into the user account, and the web browser can also send a request to access content on the content management system by signing in to the same user account.

System 900 may then present to a user of the client device, a choice between a first option to log into a user account and a second option to log into a new user account (704). The two options can be presented to the user via web content on a webpage. System 900 can receive a user input in response to the choice presented (706). The user input, for example, can be received via a keyboard, mouse, touch interface, voice, gesture, etc. If the user input indicates that the user prefers the first option (708), then system 900 can establish a local host connection between the web browser and a client-side application associated with the content management system (710). The client-side application can run a local host server on the client device, and the local host connection may be established between the web browser and the local host server. Once the connection is established, system 900 can receive user account identifying information from the client-side application via the local host connection (712). The user account identifying information can be a name, a username, an email address, a password, a token, and/or a nonce. Alternatively, some of the steps described above can be performed prior to system 900 presenting to the user a choice between the two options (704). For example, depending on the implementation of the method, system 900 can perform steps 710, 712 prior to performing steps 704, 706.

Once the user account identifying information is received, system 900 can log the web browser into the user account by using the user account identifying information (714). The web browser can send the user account identifying information to the content management system to verify that it is running on the same device as the client application and that it received the user account identifying information from the client application. Specifically, upon navigating to a website associated with the content management system (e.g., examplecms.com), system 900 can transmit the user account identifying information to the content management system via the web browser. The web browser can be logged into the user account at the website associated with the content management system and without the web browser receiving, from a user of the client device, user credentials associated with the user account. In other words, the user would not have to type in the same user credentials (e.g., username and password) to the web browser the same way the user entered the same information to the client application because the web browser can use the user account identifying information in lieu of the user credentials.

However, if the user input indicates that the user prefers the second option (708), then system 900 can request to the user to enter credentials for a new user account (716). Accordingly, the user can enter new credentials, and system 900 can log the web browser into the new user account by using the newly provided credentials (718).

FIG. 8 shows an exemplary method of assisting a web browser to log into a user account by a client-side application. This exemplary method can be performed by the client-side application. At a client application associated with a content management system, system 900 can log into a user account that is associated with the content management system (802). The client-side application may have to receive user credentials from a user first to log into the user account. At this point or sometime later, the client-side application or the content management system can generate a cryptographic nonce that can be used as a means for user account verification. Once created, the client-side application and the content management system can share the nonce so that when it is issued by the client application to another entity, such as a web browser, the content management system can compare the values to verify the match.

System 900 can receive a request from a web browser to establish a communication channel between the web browser and the client application (804). The request can be received by the client application. The client application and the web browser may be both running on the same client device. The client application can run a local web server, and the communication channel can be a local host connection between the web browser and the local web server. The client application can verify that the request comes from a legitimate source (806) prior to establishing the local connection (806). Alternatively, the verification may take place after the establishment of the local connection (806), but prior to providing user account identifying information (810). In either case, the client application may refuse to provide the user account identifying information to the web browser if the verification is unsuccessful. The determination of the legitimacy of the source of request can be performed by, for example, verifying that the request originates from a local connection within the client device. It can be also determined by checking to see whether the request comes from a website associated with the content management system (e.g., examplecms.com). Since the request may be contained in a webpage generated by the content management system and downloaded by the web browser, the client application can, for example, examine the origin header included in the webpage document to determine the request's legitimacy. System 900 can also verify the legitimacy of the request's originator by determining whether the request comes from a known web browser. For example, the content management system can assist with this determination because the content management system may have already communicated with the web browser that is making the request.

After the optional verification steps are performed, system 900 can establish the communication channel between the web browser and the client application (808). System 900 can then provide user account identifying information to the web browser via the established communication channel, thereby enabling the web browser to log into the user account using the user account identifying information (810). The user account identifying information can be a name, a username, an email address, a password, a token, a cryptographic nonce, or a combination of one or more of these items. The web browser can provide this information, received from the client application, to the content management system in order to authenticate itself and sign into the same user account as the client application. The user of the client device may not have to provide additional user credentials to the web browser because the web browser already has enough information (i.e., user account identifying information) to authenticate itself to the content management system.

FIG. 9 shows an exemplary configuration of devices and a network in accordance with the invention. An exemplary system configuration 900 for enabling access to content of a compressed content item from a variety of computing devices is shown in FIG. 9, wherein computing devices communicate via a network for purposes of exchanging content and other data. The system can be configured for use on a wide area network such as that illustrated in FIG. 9. However, the present principles are applicable to a wide variety of network configurations that facilitate the intercommunication of electronic devices. For example, each of the components of system 900 in FIG. 9 can be implemented in a localized or distributed fashion in a network.

In system 900, a user can interact with online content management system 906 through computing devices $902_1$, $902_2$, . . . , $902_n$ (collectively "902") connected to network 904 by direct and/or indirect communication. Content management system 906 can support connections from a variety of different computing devices, such as desktop computers; mobile computers; mobile communications devices, e.g. mobile phones, smart phones, tablets; smart televisions; set-top boxes; and/or any other network enabled computing devices. Computing devices 902 can be of varying type, capabilities, operating systems, etc. Furthermore, content management system 906 can concurrently accept connections from and interact with multiple computing devices 902.

A user can interact with content management system 906 via a client-side application installed on computing device $902_i$. In some embodiments, the client-side application can include a content management system specific component. For example, the component can be a stand-alone application, one or more application plug-ins, and/or a browser extension. However, the user can also interact with content management system 906 via a third-party application, such as a web browser, that resides on computing device $902_i$ and is configured to communicate with content management system 906. In either case, the client-side application can present a user interface (UI) for the user to interact with content management system 906. For example, the user can interact with the content management system 906 via a client-side application integrated with the file system or via a webpage displayed using a web browser application. Each of computing devices 902 and any client-side or third-party applications running on computing devices 902 may be considered an access platform, by which a user may access synchronized content on content management system 906.

Synchronized content management system 906 (also known as "online content management system," "file hosting service," "cloud storage service," "online file synchronization service," etc.) can make it possible for a user to store content, as well as perform a variety of content management tasks, such as retrieve, modify, browse, and/or share the content. Furthermore, content management system 906 can make it possible for a user to access the content from multiple computing devices 902. For example, computing device $902_i$ can upload content to content management system 906 via network 904. The content can later be retrieved from content management system 906 using the same computing device 902$_i$ or some other computing device 902$_j$.

To facilitate the various content management services, a user can create an account with content management system 906. The account information can be maintained in user account database 950. User account database 950 can store profile information for registered users. In some cases, the only personal information in the user profile can be a username and/or email address. However, content management system 906 can also be configured to accept additional user information.

User account database 950 can also include account management information, such as account type, e.g. free or paid; usage information, e.g. file edit history; maximum storage space authorized; storage space used; content storage locations; security settings; personal configuration settings; content sharing data; etc. Account management module 924 can be configured to update and/or obtain user account details in user account database 950. Account management module 924 can be configured to interact with any number of other modules in content management system 906.

An account can be used to store content, such as digital data, documents, text files, audio files, video files, etc., from one or more computing devices 902 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 960. Content storage 960 can be a storage device, multiple storage devices, or a server. Alternatively, content storage 960 can be a cloud storage provider or network storage accessible via one or more communications networks. Content management system 906 can hide the complexity and details from computing devices 902 so that computing devices 902 do not need to know exactly where the content items are being stored by content management system 906. In one variation, content management system 906 can store the content items in the same folder hierarchy as they appear on computing device 902$_i$. However, content management system 906 can store the content items in its own order, arrangement, or hierarchy. Content management system 906 can store the content items in a network accessible storage (SAN) device, in a redundant array of inexpensive disks (RAID), etc. Content storage 960 can store content items using one or more partition types, such as FAT, FAT32, NTFS, EXT2, EXT3, EXT4, ReiserFS, BTRFS, and so forth.

Content storage 960 can also store metadata describing content items, content item types, and the relationship of content items to various accounts, folders, or groups. The metadata for a content item can be stored as part of the content item or can be stored separately. In one variation, each content item stored in content storage 960 can be assigned a system-wide unique identifier.

Content storage 960 can decrease the amount of storage space required by identifying duplicate files or duplicate segments of files. Instead of storing multiple copies, content storage 960 can store a single copy and then use a pointer or other mechanism to link the duplicates to the single copy. Similarly, content storage 960 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 906 can be configured to support automatic synchronization of content from one or more computing devices 902. The synchronization can be platform agnostic. That is, the content can be synchronized across multiple computing devices 902 of varying type, capabilities, operating systems, etc. For example, computing device 902, can include client software, which synchronizes, via a synchronization module 932 at content management system 906, content in computing device 902$_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 906. Conversely, the background process can identify content that has been updated at content management system 906 and synchronize those changes to the local folder. The client software can provide notifications of synchronization operations, and can provide indications of content statuses directly within the content management application. Sometimes computing device 902$_i$ may not have a network connection available. In this scenario, the client software can monitor the linked folder for file changes and queue those changes for later synchronization to content management system 906 when a network connection is available. Similarly, a user can manually stop or pause synchronization with content management system 906.

A user can also view or manipulate content via a web interface generated and served by user interface module 922. For example, the user can navigate in a web browser to a web address provided by content management system 906. Changes or updates to content in the content storage 960 made through the web interface, such as uploading a new version of a file, can be propagated back to other computing devices 902 associated with the user's account. For example, multiple computing devices 902, each with their own client software, can be associated with a single account and files in the account can be synchronized between each of the multiple computing devices 902.

Content management system 906 can include a communications interface 920 for interfacing with various computing devices 902, and can interact with other content and/or service providers 909$_1$, 909$_2$, . . . , 909$_n$ (collectively "909") via an Application Programming Interface (API). Certain software applications can access content storage 960 via an API on behalf of a user. For example, a software package, such as an app on a smartphone or tablet computing device, can programmatically make calls directly to content management system 906, when a user provides credentials, to read, write, create, delete, share, or otherwise manipulate content. Similarly, the API can allow users to access all or part of content storage 960 through a web site.

Content management system 906 can also include authenticator module 926, which can verify user credentials, security tokens, API calls, specific computing devices, and so forth, to ensure only authorized clients, web browsers, and users can access files. Authenticator module 926 may generate security codes, tokens, or nonces. Authenticator module 926 may also store the codes, tokens, and nonces generated by authenticator module 926 or received from client applications in, for example, user account database 950. Authenticator module 926 can compare the stored values with the values of codes, tokens, and nonces received from web browsers to authenticate the web browsers. Further, content management system 906 can include analytics module 934 module that can track and report on aggregate file operations, user actions, network usage, total storage space used, as well as other technology, usage, or business metrics. A privacy and/or security policy can prevent unauthorized access to user data stored with content management system 906.

Content management system 906 can include sharing module 930 for managing sharing content publicly or privately. Sharing content publicly can include making the content item accessible from any computing device in network communication with content management system 906. Sharing content privately can include linking a content item in content storage 960 with two or more user accounts so that each user account has access to the content item. The sharing can be performed in a platform agnostic manner. That is, the content can be shared across multiple computing devices 902 of varying type, capabilities, operating systems, etc. The content can also be shared across varying types of user accounts.

In some embodiments, content management system 906 can include a content item management module 928 for maintaining a content directory. The content directory can identify the location of each content item in content storage 960. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 906 can use the content path to present the content items in the appropriate folder hierarchy.

A content entry can also include a content pointer that identifies the location of the content item in content storage 960. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 930 can be configured to add a user account identifier to the content entry associated with the content item, thus granting the added user account access to the content item. Sharing module 930 can also be configured to remove user account identifiers from a content entry to restrict a user account's access to the content item.

To share content publicly, sharing module 930 can be configured to generate a custom network address, such as a uniform resource locator (URL), which allows any web browser to access the content in content management system 906 without any authentication. To accomplish this, sharing module 930 can be configured to include content identification data in the generated URL, which can later be used to properly identify and return the requested content item. For example, sharing module 930 can be configured to include the user account identifier and the content path in the generated URL. Upon selection of the URL, the content identification data included in the URL can be transmitted to content management system 906 which can use the received content identification data to identify the appropriate content entry and return the content item associated with the content entry.

In addition to generating the URL, sharing module 930 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 930 can be configured to change the value of the flag to 1 or true after generating a URL to the content item.

In some embodiments, sharing module 930 can also be configured to deactivate a generated URL. For example, each content entry can also include a URL active flag indicating whether the content should be returned in response to a request from the generated URL. For example, sharing module 930 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 930 can reactivate the URL by again changing the value of the URL active flag to 1 or true. A user can thus easily restore access to the content item without the need to generate a new URL.

While content management system 906 is presented with specific components, it should be understood by one skilled in the art, that the architectural configuration of system 906 is simply one possible configuration and that other configurations with more or less components are also possible.

FIG. 10A, and FIG. 10B show exemplary possible system embodiments. Various devices disclosed throughout this disclosure, such as servers, client devices and virtual devices, may be implemented as system 1000 of FIG. 10A or system 1050 of FIG. 10B. The more appropriate embodiment will be apparent to those of ordinary skill in the art when practicing the present technology. Persons of ordinary skill in the art will also readily appreciate that other system embodiments are possible.

FIG. 10A shows a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B shows a computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1050 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that exemplary systems 1000 and 1050 can have more than one processor 1010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs. Moreover, claim language reciting "at least one of" a set indicates that one member of the set or multiple members of the set satisfy the claim.

What is claimed is:

1. A computer-implemented method comprising:
   receiving, at a content management system, a request from a device to access the content management system via a web browser;
   identifying a client-side application installed on the device by determining that the client-side application uses a same IP address as the web browser, the client-side application being associated with a local host server installed on the device and associated with the content management system, wherein the local host server is referenced by a local host Internet Protocol (IP) address;
   causing the web browser to open a local host connection using the local host IP address to reference the local host server run by the client-side application, wherein the web browser accesses user account identifying information for the user account from the client-side application through the local host connection; and
   causing the web browser to log into the user account by using the user account identifying information.

2. The computer-implemented method of claim 1, wherein the user account identifying information is at least one of a name, a username, an email address, a password, a token, and a cryptographic nonce.

3. The computer-implemented method of claim 1, wherein the web browser logs into the user account without receiving, from a user of the device, user credentials associated with the user account.

4. The computer-implemented method of claim 1, further comprising: causing the web browser to request a confirmation from the device prior to causing the web browser to log into the user account.

5. The computer-implemented method of claim 1, further comprising:
   sending a confirmation request to the web browser, the confirmation request asking a user of the device to confirm whether to log into the user account;
   when a positive confirmation is received from the user in response to the confirmation request, causing the web browser to log in to the user account without requiring the user to provide login credentials; and
   when a negative confirmation is received from the user in response to the confirmation request, causing the web browser to request the login credentials from the user.

6. A system comprising:
   one or more processors; and
   a non-transitory computer-readable storage medium storing instructions which, when executed by the one or more processors, cause the one or more processors to perform operations comprising:
   sending, from a client device to a content management system, a request to access the content management system via a web browser;
   identifying a client-side application installed on the client device by determining that the client-side application is using a same IP address as the web browser;
   establishing a local host connection between the web browser and a local host server via the client-side application associated with the content management system, wherein the local host server is referenced by a local host Internet Protocol (IP) address over the local host connection;
   receiving user account identifying information from the local host server via the local host connection; and
   logging the web browser into the user account by using the user account identifying information.

7. The system of claim 6, wherein the client-side application runs on the client device.

8. The system of claim 6, wherein the client-side application is logged into the user account before the request is sent.

9. The system of claim 6, wherein the client-side application provides a configuration request prior to logging the web browser into the user account by using the user account identifying information.

10. The system of claim 6, wherein logging the web browser into the user account comprises:
    upon navigating to a website associated with the content management system, transmitting the user account identifying information to the content management system via the web browser.

11. The system of claim 10, wherein logging the web browser into the user account further comprises:

presenting, to a user of the client device, a choice between a first option to log into the user account and a second option to log into a new user account;

receiving a user input in response to the choice;

when the user input indicates that the user prefers the first option, logging the web browser into the user account; and when the user input indicates that the user prefers the second option, requesting to the user to enter credentials for the new user account and logging the web browser into the new user account by using the credentials.

12. The system of claim 6, wherein the user account identifying information is at least one of a name, a username, an email address, a password, a token, and a cryptographic nonce.

13. The system of claim 6, wherein logging the web browser into the user account is performed at a website associated with the content management system and without the web browser receiving, from a user of the client device, user credentials associated with the user account.

14. A non-transitory computer-readable storage device storing instructions which, when executed by one or more processors, cause the one or more processors to perform operations comprising:

at a client application, on a client device associated with a content management system, logging into a user account associated with the content management system;

receiving a request from a web browser, on the client device having a local host server;

verifying that the request comes from a legitimate source by determining that the request comes from a website associated with the content management system;

establishing a communication channel between the web browser and the client application, wherein the communication channel, using a local host Internet Protocol (IP) address, is established via the local host server; and providing user account identifying information to the web browser via the communication channel, thereby enabling the web browser to log into the user account using the user account identifying information.

15. The non-transitory computer-readable storage device of claim 14, wherein the user account identifying information is at least one of a name, a username, an email address, a password, a token, and a cryptographic nonce.

16. The non-transitory computer-readable storage device of claim 14, wherein the client application provides a configuration request prior to enabling the web browser to log into the user account using the user account identifying information.

17. The non-transitory computer-readable storage device of claim 14, wherein verifying that the request comes from the legitimate source further comprises:

determining whether the request comes from a local connection.

18. The non-transitory computer-readable storage device of claim 14, wherein verifying that the request comes from the legitimate source further comprises:

determining whether the request comes from a known web browser.

19. The non-transitory computer-readable storage device of claim 14, further comprising:

sending a confirmation request to the web browser, the confirmation request asking a user of the client device to confirm whether to log into the user account, wherein logging the web browser into the user account is performed at the website associated with the content management system and without the web browser receiving, from the user of the client device, user credentials associated with the user account;

causing, when a positive confirmation is received from the user in response to the confirmation request, the web browser to log in to the user account without requiring the user to provide login credentials; and causing, when a negative confirmation is received from the user in response to the confirmation request, the web browser to request the login credentials from the user.

* * * * *